: US 9,773,102 B2
(45) Date of Patent: Sep. 26, 2017

(12) United States Patent
Graham et al.

(54) SELECTIVE FILE ACCESS FOR APPLICATIONS

(75) Inventors: Scott Graham, Seattle, WA (US); Kavitha Radhakrishnan, Redmond, WA (US); Sermet Iskin, Bellevue, WA (US); Katrina M. Blanch, Seattle, WA (US); Steven Ball, Redmond, WA (US); John Hazen, Kirkland, WA (US); Tyler Kien Beam, Redmond, WA (US); Allen Kim, Seattle, WA (US); Guillermo Enrique Rueda Quintero, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/229,367

(22) Filed: Sep. 9, 2011

(65) Prior Publication Data

US 2013/0067600 A1    Mar. 14, 2013

(51) Int. Cl.
*G06F 1/00* (2006.01)
*G06F 21/33* (2013.01)
*G06F 21/62* (2013.01)

(52) U.S. Cl.
CPC ........ *G06F 21/335* (2013.01); *G06F 21/6218* (2013.01); *G06F 2221/2141* (2013.01)

(58) Field of Classification Search
CPC .............. G06F 9/44536; G06F 9/4411; G06F 17/30902; G06F 8/60; G06F 21/335;
(Continued)

(56) References Cited

U.S. PATENT DOCUMENTS 5,721,824 A    2/1998   Taylor
5,974,549 A    10/1999  Golan
(Continued)

FOREIGN PATENT DOCUMENTS

CN    1582430 A    2/2005
CN    1617101 A    5/2005
(Continued)

OTHER PUBLICATIONS

"Access Control Lists in Linux", Retrieved at <<http://www.suse.de/~agruen/acl/chapter/fs_acl-en.pdf, Jul. 18, 2003, pp. 13.
(Continued)

*Primary Examiner* — Baotran N To
*Assistant Examiner* — Sayed Beheshti Shirazi
(74) *Attorney, Agent, or Firm* — Fiala & Weaver P.L.L.C.

(57) ABSTRACT

Methods, systems, and computer program products are provided for enabling selective file system access by applications. An application is installed in a computing device. An application manifest associated with the application is received. The application manifest indicates one or more file types that the application is allowed to access. The indicated file type(s) are registered in a location accessible by a broker service. The application is launched as an application process. The application process is isolated in an application container. The application container prevents direct access by the application process to file system data. An access request related to first data of the file system data is received at the broker service from the application process. Access by the application process to the first data is enabled when the broker service determines that a file type of the first data is included in the registered file type(s).

20 Claims, 7 Drawing Sheets

(58) Field of Classification Search
CPC ......... G06F 21/6218; G06F 2221/2113; G06F 2221/2115; G06F 2221/2141; G06F 9/44505; H04L 63/0823; H04L 63/123; H04L 65/4069; H04L 9/3247; H04L 41/0893; H04L 63/101
USPC .............................. 726/3, 1, 22, 30; 713/176
See application file for complete search history.

(56) References Cited

U.S. PATENT DOCUMENTS

| | | | |
|---|---|---|---|
| 6,052,120 | A | 4/2000 | Nahi et al. |
| 6,101,607 | A | 8/2000 | Bachand et al. |
| 6,117,187 | A | 9/2000 | Staelin |
| 6,151,643 | A | 11/2000 | Cheng et al. |
| 6,279,111 | B1 | 8/2001 | Jensenworth et al. |
| 6,308,173 | B1 | 10/2001 | Glasser et al. |
| 6,378,071 | B1 | 4/2002 | Sasaki et al. |
| 6,412,070 | B1 | 6/2002 | Van Dyke et al. |
| 6,604,209 | B1 | 8/2003 | Grucci et al. |
| 6,694,434 | B1 | 2/2004 | McGee et al. |
| 6,697,569 | B1 | 2/2004 | Gomez et al. |
| 6,725,452 | B1 | 4/2004 | Te'eni et al. |
| 6,865,659 | B2 | 3/2005 | Montemayor |
| 7,031,276 | B2 | 4/2006 | Inoue |
| 7,069,330 | B1 | 6/2006 | McArdle et al. |
| 7,151,832 | B1 | 12/2006 | Fetkovich et al. |
| 7,152,243 | B2 | 12/2006 | Bourne et al. |
| 7,337,442 | B2 | 2/2008 | VoBa et al. |
| 7,392,383 | B2 | 6/2008 | Basibes et al. |
| 7,398,532 | B1 | 7/2008 | Barber et al. |
| 7,401,235 | B2 | 7/2008 | Mowers et al. |
| 7,472,377 | B2 | 12/2008 | Anand et al. |
| 7,475,396 | B2 | 1/2009 | Kapoor |
| 7,478,094 | B2 | 1/2009 | Ho et al. |
| 7,512,810 | B1 | 3/2009 | Ryan |
| 7,542,988 | B1 | 6/2009 | Cook et al. |
| 7,607,131 | B2 | 10/2009 | Oe et al. |
| 7,650,501 | B1 | 1/2010 | Brunette et al. |
| 7,650,627 | B1 | 1/2010 | Stancheva et al. |
| 7,664,924 | B2 * | 2/2010 | Safa ................ G06F 21/52 711/163 |
| 7,698,393 | B2 | 4/2010 | Milstein et al. |
| 7,716,734 | B2 | 5/2010 | Birrell et al. |
| 7,774,753 | B1 * | 8/2010 | Reilly ................ G06F 9/543 715/770 |
| 7,779,265 | B2 | 8/2010 | Dubhashi et al. |
| 7,870,387 | B1 | 1/2011 | Bhargava et al. |
| 7,925,875 | B2 | 4/2011 | McAvoy |
| 7,934,087 | B2 | 4/2011 | Carter |
| 8,001,528 | B2 | 8/2011 | Bemabeu-Auban et al. |
| 8,073,442 | B2 | 12/2011 | Frank et al. |
| 8,185,889 | B2 | 5/2012 | Kinder et al. |
| 8,468,608 | B1 | 6/2013 | Hernacki et al. |
| 8,990,561 | B2 * | 3/2015 | Sheehan ............ G06F 9/468 713/167 |
| 9,118,686 | B2 | 8/2015 | Diaz-Cuellar et al. |
| 2002/0019941 | A1 | 2/2002 | Chan et al. |
| 2002/0071565 | A1 | 6/2002 | Kurn et al. |
| 2003/0009491 | A1 | 1/2003 | Kanai |
| 2003/0084134 | A1 * | 5/2003 | Pace ................ G06F 8/60 709/223 |
| 2003/0229900 | A1 | 12/2003 | Reisman |
| 2004/0030926 | A1 | 2/2004 | Clark |
| 2004/0039924 | A1 | 2/2004 | Baldwin et al. |
| 2004/0148514 | A1 | 7/2004 | Fee et al. |
| 2004/0181557 | A1 * | 9/2004 | Orbits et al. ............ 707/200 |
| 2004/0193606 | A1 | 9/2004 | Arai et al. |
| 2004/0199787 | A1 | 10/2004 | Hans et al. |
| 2005/0055315 | A1 | 3/2005 | Darweesh et al. |
| 2005/0071641 | A1 | 3/2005 | Basibes et al. |
| 2005/0091535 | A1 | 4/2005 | Kavalam et al. |
| 2005/0091655 | A1 | 4/2005 | Probert et al. |
| 2005/0091658 | A1 * | 4/2005 | Kavalam ............ G06F 21/31 718/104 |
| 2005/0132350 | A1 | 6/2005 | Markley et al. |
| 2005/0154738 | A1 | 7/2005 | Thomas et al. |
| 2005/0246762 | A1 | 11/2005 | Girouard et al. |
| 2005/0256859 | A1 | 11/2005 | Keohane et al. |
| 2005/0289348 | A1 | 12/2005 | Joy et al. |
| 2006/0048129 | A1 | 3/2006 | Napier et al. |
| 2006/0080546 | A1 | 4/2006 | Brannon et al. |
| 2006/0090192 | A1 | 4/2006 | Corby et al. |
| 2006/0155986 | A1 | 7/2006 | Kleinhuis et al. |
| 2006/0174252 | A1 * | 8/2006 | Besbris ................ G06F 9/445 719/330 |
| 2006/0174334 | A1 | 8/2006 | Perlin et al. |
| 2006/0193467 | A1 | 8/2006 | Levin |
| 2006/0253909 | A1 | 11/2006 | Cherepov |
| 2006/0259606 | A1 | 11/2006 | Rogers et al. |
| 2006/0259980 | A1 | 11/2006 | Field et al. |
| 2007/0005734 | A1 | 1/2007 | Abdo |
| 2007/0027872 | A1 | 2/2007 | Johnson et al. |
| 2007/0083655 | A1 * | 4/2007 | Pedersen ................ H04L 63/102 709/226 |
| 2007/0157302 | A1 | 7/2007 | Ottamalika et al. |
| 2007/0192500 | A1 | 8/2007 | Lum |
| 2007/0208857 | A1 | 9/2007 | Danner et al. |
| 2007/0226790 | A1 | 9/2007 | Maher et al. |
| 2007/0234412 | A1 | 10/2007 | Smith et al. |
| 2007/0239981 | A1 | 10/2007 | Lessing |
| 2008/0047000 | A1 | 2/2008 | Kanamaru et al. |
| 2008/0066148 | A1 | 3/2008 | Lim |
| 2008/0092133 | A1 * | 4/2008 | Mantere ................ G06F 8/61 717/174 |
| 2008/0120707 | A1 | 5/2008 | Ramia |
| 2008/0162698 | A1 | 7/2008 | Hopen et al. |
| 2008/0201705 | A1 | 8/2008 | Wookey |
| 2008/0220878 | A1 | 9/2008 | Michaelis |
| 2008/0244723 | A1 | 10/2008 | Brewster et al. |
| 2008/0282354 | A1 | 11/2008 | Wobber et al. |
| 2008/0307491 | A1 * | 12/2008 | Duri ................ G06Q 20/382 726/1 |
| 2009/0022325 | A1 | 1/2009 | Naedele |
| 2009/0064003 | A1 | 3/2009 | Harris et al. |
| 2009/0100421 | A1 | 4/2009 | Flaming et al. |
| 2009/0144659 | A1 | 6/2009 | Do |
| 2009/0170431 | A1 | 7/2009 | Pering et al. |
| 2009/0193507 | A1 | 7/2009 | Ibrahim |
| 2009/0222659 | A1 | 9/2009 | Miyabayashi et al. |
| 2009/0222894 | A1 | 9/2009 | Kenny et al. |
| 2009/0249283 | A1 | 10/2009 | Bourdon |
| 2009/0249436 | A1 | 10/2009 | Coles et al. |
| 2009/0307684 | A1 | 12/2009 | Best et al. |
| 2009/0319673 | A1 | 12/2009 | Peters |
| 2009/0327900 | A1 | 12/2009 | Noll et al. |
| 2010/0037216 | A1 * | 2/2010 | Carcerano ................ G06F 8/65 717/173 |
| 2010/0058320 | A1 | 3/2010 | Milligan et al. |
| 2010/0081375 | A1 | 4/2010 | Rosenblatt et al. |
| 2010/0100929 | A1 | 4/2010 | Bae et al. |
| 2010/0107215 | A1 | 4/2010 | Bechtel et al. |
| 2010/0153671 | A1 * | 6/2010 | Safa ................ G06F 21/52 711/163 |
| 2010/0174599 | A1 | 7/2010 | Rosenblatt et al. |
| 2010/0192147 | A1 | 7/2010 | Kadota |
| 2010/0192211 | A1 | 7/2010 | Bono et al. |
| 2010/0221999 | A1 | 9/2010 | Braun et al. |
| 2010/0229165 | A1 * | 9/2010 | Normington ........... G06F 9/445 717/166 |
| 2010/0229242 | A1 | 9/2010 | Iga |
| 2010/0278345 | A1 | 11/2010 | Alsina et al. |
| 2010/0287513 | A1 | 11/2010 | Singh et al. |
| 2010/0287547 | A1 | 11/2010 | Korkishko et al. |
| 2010/0293383 | A1 * | 11/2010 | Coughlin ................ G06F 21/606 713/176 |
| 2010/0318997 | A1 | 12/2010 | Li et al. |
| 2011/0070827 | A1 | 3/2011 | Griffin et al. |
| 2011/0070837 | A1 | 3/2011 | Griffin et al. |
| 2011/0098030 | A1 | 4/2011 | Luoma |
| 2011/0125799 | A1 | 5/2011 | Kandasamy et al. |
| 2011/0231836 | A1 * | 9/2011 | Wookey ................ G06F 8/68 717/174 |

(56) References Cited

U.S. PATENT DOCUMENTS

| | | | |
|---|---|---|---|
| 2011/0252417 | A1 | 10/2011 | Cui et al. |
| 2012/0005674 | A1* | 1/2012 | Larimore ............ G06F 9/45537 718/1 |
| 2012/0066757 | A1* | 3/2012 | Vysogorets ............. G06F 21/34 726/9 |
| 2012/0194534 | A1* | 8/2012 | Benno ................ H04N 21/2183 345/557 |
| 2012/0240236 | A1* | 9/2012 | Wyatt .................... G06F 21/564 726/25 |
| 2012/0297288 | A1 | 11/2012 | Mansouri |
| 2012/0303818 | A1* | 11/2012 | Thibeault .............. G06F 9/5072 709/226 |
| 2013/0019233 | A1* | 1/2013 | Pardehpoosh ........ G06F 21/121 717/170 |
| 2013/0024929 | A1 | 1/2013 | Abraham et al. |
| 2013/0054734 | A1* | 2/2013 | Bond .................... G06F 9/4856 709/217 |
| 2013/0061273 | A1 | 3/2013 | Reisman |
| 2013/0061309 | A1 | 3/2013 | Diaz-Cuellar et al. |
| 2013/0061316 | A1 | 3/2013 | Iskin et al. |
| 2013/0062401 | A1 | 3/2013 | Sheehan et al. |
| 2013/0065526 | A1* | 3/2013 | Pottier .................... H04L 67/34 455/41.2 |
| 2013/0067459 | A1 | 3/2013 | Sannidhanam et al. |
| 2013/0067600 | A1 | 3/2013 | Graham et al. |
| 2013/0263262 | A1* | 10/2013 | Forristal ............. G06F 11/3024 726/22 |
| 2013/0283377 | A1 | 10/2013 | Das et al. |
| 2014/0173071 | A1* | 6/2014 | Hazen ................ H04L 63/0876 709/223 |
| 2014/0344667 | A1 | 11/2014 | Risney et al. |
| 2015/0135206 | A1 | 5/2015 | Reisman |
| 2015/0135214 | A1 | 5/2015 | Reisman |
| 2015/0178495 | A1 | 6/2015 | Sheehan et al. |

FOREIGN PATENT DOCUMENTS

| | | |
|---|---|---|
| CN | 1633084 A | 6/2005 |
| CN | 1959631 A | 5/2007 |
| CN | 101017447 A | 8/2007 |
| CN | 101131725 A | 2/2008 |
| CN | 101616719 A | 12/2009 |
| CN | 101622624 A | 1/2010 |
| CN | 101925913 A | 12/2010 |
| CN | 102129364 A | 7/2011 |
| EP | 2086206 A1 | 8/2009 |
| JP | 2004192601 A | 7/2004 |
| JP | 2005129066 A | 5/2005 |
| JP | 2005528051 A | 9/2005 |
| JP | 2010176690 A | 8/2010 |
| JP | 2011002962 A | 1/2011 |
| WO | 0205184 A2 | 1/2002 |
| WO | 03100581 A2 | 12/2003 |
| WO | 2009047473 A2 | 4/2009 |
| WO | 2010002497 A1 | 1/2010 |
| WO | 2013036472 A1 | 3/2013 |

OTHER PUBLICATIONS

"User Accounts & Admin Privileges", Retrieved at <http://www.techno-kitten.com/Changes_to_PowerBuilder/New_in_Power...B111New_-_User_Accounts_and_A/pb111new_-_user_accounts_and_a.html>, Retrieved Date: Jul. 29, 2011, pp. 2.

"ClickOnce Security and Deployment", Retrieved at <<http://msdn.microsoft.com/en-us/library/t71a733d.aspx>>, Retrieved Date: Jul. 25, 2011, p. 1.

"International Search Report", Mailed Date: Dec. 10, 2012, Application No. PCT/US2012/053623, Filed Date: Sep. 4, 2012, pp. 9.

"International Search Report", Mailed Date: Sep. 12, 2012, Application No. PCT/US2011/055741, Filed Date: Oct. 11, 2011, pp. 9.

Engelsma et al., "EncounterEngine: Integrating Bluetooth User Proximity Data into Social Applications," IEEE International Conference on Wireless & Mobile Computing, Networking & Communication, WIMOB '08, Oct. 2008, pp. 6.

Esbensen et al., "Pour Images—An Interactive System for Sharing Images", International Conference on Pervasive Computing and Communications, Sep.-Dec. 2010, pp. 9.

Kortuem et al., "Sensing and Visualizing Spatial Relations of Mobile Devices", UIST '05 Proceedings of the 18th Annual ACM Symposium on User Interface Software and Technology, Oct. 2005, pp. 10.

Manninen, JP., "LoKast shares media between iPhones and Android phones", Retrieved from <<http://venturebeat.com/2010/07/21110kast-shares-media-between-iphones-and-android-phones/>>, Jul. 21, 2010, pp. 3.

Rekimoto et al., "Proximal Interactions: A Direct Manipulation Technique for Wireless Networking", IFIP Conference on Human-Computer Interaction—Interact 2003, Aug. 2003, pp. 8.

Xing et al., "Proximiter: Enabling Mobile Proximity-Based Content Sharing on Portable Devices", IEEE International Conference on Pervasive Computing and Communications, PerCom 2009, Mar. 2009, pp. 3.

"Android Developers Security and Permissions," Retrieved from <<http://developer.android.com/guide/topics/security/security.html>>,Jul. 18, 2011, pp. 5.

"Dependency Resolution Rules," Retrieved from <<http://nuget.codeplex.com/wikipage?title=Dependency%20Resolution>>, Jul. 15, 2011, pp. 3.

"Network Policy Settings Properties", Retrieved at <<http://technet.microsoft.com/en-us/library/ cc772474(WS.10).aspx>>, Retrieved Date: Jul. 11, 2011, p. 1.

"Securing the Process Control Network", Retrieved at <<http://www.enterasys.com/company/literature/ threat-mgmt-process-control-wp.pdf>>, Retrieved Date: Jul. 11, 2011, pp. 6.

"Security for runtime resources: Access control lists", Retrieved from <<http://publib.boulder.ibm.com/infocenter/wmbhelp/ v6r1mO/index.jsp?topic=/com.ibm.etools.mft.doc/ap01380_.htm>>, Jul. 27, 2011, pp. 3.

"Structural Analysis," Retrieved from <<http://www.headwaysoftware.com/products/structure1 01/structrual-analysis.php#deep-structural-analysis-section>>, Mar. 13, 2012, pp. 12.

Burrows, Daniel., "Modelling and Resolving Software Dependencies", Retrieved from <<http://www.isi.us.es/-segura/files/papers/galind010-acota.pdf>>, Proceedings of the First International Workshop on Automated Configuration and Tailoring of Applications, Jun. 15, 2005, pp. 16.

Galindo et al., "Debian Packages Repositories as Software Product Line Models. Towards Automated Analysis", Retrieved from <<http://www.isi.us.esFsegura/files/papers/galind010-acota.pdf>>, Proceedings of the First International Workshop on Automated Configuration and Tailoring of Applications, Sep. 2010, pp. 6.

Lange, Thomas., "FAI Guide (Fully Automatic Installation)", Version 2.1, Apr. 2, 2003 for FAI version 2.4.1, Dec. 5, 2005. pp. 59.

Manzoor et al., "Silent Unattended Installation Package Manager— SUIPM", Retrieved from http://ieeexplore.ieee.org/ stamp/stamp.jsp?tp=&arnumber=5172599>>, International Conference on Computational Intelligence for Modelling Contro; & Automation, Dec. 10-12, 2008, pp. 6.

Abadi et al., "Access Control in a World of Software Diversity", Retrieved from <<http://research.microsoft.com/pubs/54665/accesscontrolwithdiversity.pdf>>, Proceeding of the Tenth Workshop on Hot Topics in Operating Systems, USENIX, Jun. 2005, pp. 6.

Rodriguez, Jaime., "Windows Phone Capabilities Security Model", Retrieved from <<http://blogs.msdn.com/b/jaimer/ archive/2010/04/30windows-phone-capabilites-security-model.aspx>>, Jul. 18, 2011, pp. 3.

Supplementary Search Report issued in European Patent Application No. 12830755.0, Mailed Date: Mar. 24, 2015, 6 Pages.

"Manifest.permission", Android Developers, Published on: Apr. 28, 2011, Available at: <http://web.archive.org/web/20110428105901/http://developer.android.com/reference/android/Manifest.permission.html>, 15 pages.

Office Action Received for CN Patent Application No. 201210331181.7, mailed on Oct. 8, 2014, 13 Pages (6 pages of CN Office Action and 7 pages of English translation).

(56) References Cited

OTHER PUBLICATIONS

Second Office Action and Search Report Received for China Patent Application No. 201210331181.7, Mail Date: Sep. 1, 2015, 10 Pages.
"Amendment and Response Filed in U.S. Appl. No. 13/229,446", dated Feb. 15, 2016, 21 Pages.
"Amendment and Response Filed in U.S. Appl. No. 13/229,446", dated Jan. 22, 2014, 19 Pages.
"Amendment and Response Filed in U.S. Appl. No. 13/229,446", dated Feb. 23, 2015, 21 Pages.
"Amendment and Response Filed in U.S. Appl. No. 13/229,446", dated Jun. 30, 2014, 22 Pages.
"Amendment and Response Filed in US Patent Application No. 13/229,446", dated Sep. 4, 2015, 21 Pages.
"Final Office Action Issued in U.S. Appl.No. 13/229,446", dated Jun. 19, 2015, 18 Pages.
"Final Office Action Issued in U.S. Appl. No. 13/229,446", dated Apr. 9, 2014, 19 Pages.
"Non Final Office Action Issued in U.S. Appl. No. 13/229,446", dated Oct. 22, 2013, 16 Pages.
"Non Final Office Action Issued in U.S. Appl. No. 13/229,446", dated Oct. 23, 2014, 17 Pages.
"Non Final Office Action Issued in U.S. Appl. No. 13/229,446", dated Nov. 13, 2015, 20 Pages.
"Final Office Action Issued in U.S. Appl. No. 13/230,640", dated Mar. 25, 2015, 18 Pages.
"Final Office Action Issued in U.S. Appl. No. 13/230,640", dated Apr. 14, 2016, 19 Pages.
"Non Final Office Action Issued in U.S. Appl. No. 13/230,640", dated Jul. 23, 2015, 19 Pages.
"Non Final Office Action Issued in U.S. Appl. No. 13/230,640", dated Oct. 21, 2014, 16 Pages.
"Amendment and Response Filed in U.S. Appl. No. 13/714,389", dated Mar. 19, 2015, 14 Pages.
"Amendment and Response Filed in U.S. Appl. No. 13/714,389", dated Oct. 13, 2015, 15 Pages.
"Final Office Action Issued in U.S. Appl. No. 13/714,389", dated Feb. 5, 2016, 10 Pages.
"Non Final Office Action Issued in U.S. Appl. No. 13/714,389", dated Jul. 13, 2015, 9 Pages.
"Non Final Office Action Issued in U.S. Appl. No. 13/714,389", dated Jan. 5, 2015, 9 Pages.
"Amendment and Response Filed in U.S. Appl. No. 13/898,432", dated Oct. 19, 2015, 18 Pages.
"Final Office Action Issued in U.S. Appl. No. 13/898,432", dated Jan. 15, 2016, 22 Pages.
"Non Final Office Action Issued in U.S. Appl. No. 13/898,432", dated Jul. 17, 2015, 17 Pages.
"Notice of Publication Issued in U.S. Appl. No. 13/898,432", dated Nov. 20, 2014, 1 Page.
"Amendment and Response Filed in U.S. Appl. No. 14/639,615", dated Jan. 21, 2016, 7 Pages.
"Non Final Office Action Issued in U.S. Appl. No. 14/639,615", dated Oct. 21, 2015, 5 Pages.
"Notice of Allowance Issued in U.S. Appl. No. 14/639,615", dated Apr. 5, 2016, 8 Pages.
"Notice of Allowance Issued in U.S. Appl. No. 14/639,615", dated Jul. 13, 2016, 8 Pages.
"Notice of Allowance Issued in U.S. Appl. No. 14/639,615", dated Sep. 28, 2016, 8 Pages.
"First Office Action and Search Report Issued in Chinese Patent Application No. 201210326881.7", dated Sep. 3, 2014, 12 Pages.
"Second Office Action and Search Report Issued in Chinese Patent Application No. 201210326881.7", dated May 19, 2015, 13 Pages.
"First Office Action and Search Report Issued in Chinese Patent Application No. 201210335798.6", dated Sep. 23, 2014, 13 Pages.
"Second Office Action and Search Report Issued in Chinese Patent Application No. 201210335798.6", dated May 5, 2015, 14 Pages.
"Third Office Action Issued in Chinese Patent Application No. 201210335798.6", dated Dec. 28, 2015, 6 Pages.

"Office Action Issued in Japanese Patent Application No. 2014-529674", dated Sep. 29, 2015, 8 Pages.
"Office Action Issued in Japanese Patent Application No. 2014-529686", dated Aug. 25, 2015, 8 Pages.
"Office Action Issued in Japanese Patent Application No. 2014-529686", dated Apr. 26, 2016, 9 Pages.
"Office Action Issued in Japanese Patent Application No. 2014-529794", dated Aug. 9, 2016, 6 Pages.
Abadi, et al., "A Logical Account of NGSCB", In Proceedings of Formal Techniques for Networked and Distributed Systems, Sep. 2004, 13 Pages.
Cutler, Kim-Mai, "Amid Privacy Concerns, Apple Has Started Rejecting Apps That Access UDIDs", Retrieved from http://techcrunch.com/2012/03/24/apple-udids/>, Mar. 24, 2012, 1 Page.
"Authorization API", Retrieved from <<https://web.archive.org/web/20120704214719/http://developers.cloudmade.com/projects/show/auth>>, Retrieved Date: Jul. 9, 2012, 3 Pages.
"CFUUID Reference", Retrieved from <<http://web.archive.org/web/20121017034226/https://developerapple.com/library/mac/documentation/CoreFoundation/Reference/CFUUIDRef/CFUUIDRef.pdf>>, Jun. 11, 2012, 16 Pages.
"Class StreamSource", Retrieved from <<http://docs.oracle.com/javase/6/docs/api/javax/xml/transform/stream/StreamSource.html>>, Retrieved Date: Mar. 12, 2013, 6 Pages.
"Customizing the Content, Look and Feel of XML Data", Retrieved from <<https://docs.tibco.com/pub/hawk/4.9.0_november_2010/html/tib_hawk_http_adapter_user_guide/wwhelp/wwhimpl/common/html/wwhelp.htm#context=tib_hawk_http_adapter_user_guide&file=httpAdap.3.05.htm>>, Retrieved Date: Mar. 12, 2013, 3 Pages.
"Identifying App Installations", Retrieved from <<http://android-developers.blogspot.in/2011/03/identifying-app-installations.html>>, Mar. 30, 2011, 4 Pages.
"Loading HTML Content from a Stream", Retrieved from https://msdn.microsoft.com/en-us/library/aa752047 (v=vs.85).aspx>>, Retrieved Date: Mar. 12, 2013, 5 Pages.
"SecureUDID", Retrieved from <<http://www.secureudid.org/>>, Retrieved Date: Dec. 11, 2012, 3 Pages.
"UIDevice with UniqueIdentitier for iOS 5", Retrieved from <<https://github.com/gekitz/UIDevice-with-UniqueIdentitier-for-iOS-5>>, Retrieved Date: Dec. 11, 2012, 5 Pages.
"European Search Report Issued in European Patent Application No. 118721018", dated Apr. 9, 2015, 6 Pages.
"European Search Report Issued in European Patent Application No. 11872418.6", dated Apr. 29, 2015, 7 Pages.
"Office Action Issued in European Patent Application No. 12830755.0", dated Mar. 20, 2017, 5 Pages.
"Amendment and Response Filed in U.S. Appl. No. 13/225,945", dated Sep. 2, 2014, 18 Pages.
"Amendment and Response Filed in U.S. Appl. No. 13/225,945", dated Mar. 23, 2015, 17 Pages.
"Amendment and Response Filed in U.S. Appl. No. 13/225,945", dated May 29, 2013, 16 Pages.
"Amendment and Response Filed in U.S. Appl. No. 13/225,945", dated Jul. 17, 2013, 19 Pages.
"Amendment and Response Filed in U.S. Appl. No. 13/225,945", dated Dec. 22, 2014, 16 Pages.
"Final Office Action Issued in U.S. Appl. No. 13/225,945", dated Apr. 16, 2015, 21 Pages.
"Final Office Action Issued in U.S. Appl. No. 13/225,945", dated Jun. 24, 2013, 21 Pages.
"Final Office Action Issued in U.S. Appl. No. 13/225,945", dated Sep. 22, 2014, 26 Pages.
"Non Final Office Action Issued in U.S. Appl. No. 13/225,945", dated Jan. 14, 2015, 25 Pages.
"Non Final Office Action Issued in U.S. Appl. No. 13/225,945", dated Mar. 18, 2013, 17 Pages.
"Non Final Office Action Issued in U.S. Appl. No. 13/225,945", dated May 30, 2014, 23 Pages.
"Amendment and Response Filed in U.S. Appl. No. 13/226,223", dated Feb. 5, 2015, 24 Pages.
"Amendment and Response Filed in U.S. Appl. No. 13/226,223", dated Jul. 17, 2013, 16 Pages.

(56) References Cited

OTHER PUBLICATIONS

"Amendment and Response Filed in U.S. Appl. No. 13/226,223", dated Jul. 21, 2014, 22 Pages.
"Amendment and Response Filed in U.S. Appl. No. 13/226,223", dated Oct. 2, 2013, 19 Pages.
"Amendment and Response Filed in U.S. Appl. No. 13/226,223", dated Oct. 15, 2014, 17 Pages.
"Final Office Action Issued in U.S. Appl. No. 13/226,223", dated Aug. 23, 2013, 19 Pages.
"Final Office Action Issued in U.S. Appl. No. 13/226,223", dated Sep. 19, 2014, 23 Pages.
"Non Final Office Action Issued in U.S. Appl. No. 13/226,223", dated Apr. 17, 2013, 16 Pages.
"Non Final Office Action Issued in U.S. Appl. No. 13/226,223", dated May 30, 2014, 25 Pages.
"Non Final Office Action Issued in U.S. Appl. No. 13/226,223", dated Nov. 14, 2014, 29 Pages.
"Notice of Allowance Issued in U.S. Appl. No. 13/226,223", dated Apr. 8, 2015, 14 Pages.
"Amendment and Response Filed in U.S. Appl. No. 13/228,695", dated Apr. 18, 2013, 13 Pages.
"Amendment and Response Filed in U.S. Appl. No. 13/228,695", dated Jun. 18, 2013, 15 Pages.
"Amendment and Response Filed in U.S. Appl. No. 13/228,695", dated Jul. 22, 2014, 15 Pages.
"Amendment and Response Filed in U.S. Appl. No. 13/228,695", dated Oct. 24, 2014, 17 Pages.
"Final Office Action Issued in U.S. Appl. No. 13/228,695", dated Sep. 22, 2014, 12 Pages.
"Final Office Action Issued in U.S. Appl. No. 13/228,695", dated May 31, 2013, 15 Pages.
"Non Final Office Action Issued in U.S. Appl. No. 13/228,695", dated Apr. 30, 2014, 10 Pages.
"Non Final Office Action Issued in U.S. Appl. No. 13/228,695", dated Feb. 12, 2013, 10 Pages.
"Notice of Allowance Issued in U.S. Appl. No. 13/228,695", dated Nov. 10, 2014, 9 Pages.
Steinberg, et al., "A Web Middleware Architecture for Dynamic Customization of Web Content for Wireless Clients", In Proceedings of the 11th International Conference on World Wide Web, May 7, 2002, 21 Pages.
Smith, Eric, "iPhone Applications & Privacy Issues: An Analysis of Application Transmission of iPhone Unique Device Identifiers (UDIDs)", Retrieved from <<http://pskl.us/wp/wp-content/uploads/2010/09/iPhone-Applications-Privacy-Issues.pdf>>, Oct. 1, 2010, 19 Pages.
"International Search Report & Written Opinion Issued in PCT Application No. PCT/US2011/055538", dated Sep. 3, 2012, 8 Pages.
Eno, "How to Find U.S. Appl. No. of Android Device", Retrieved from http://stackoverflow.com/questions/2322234/how-to-find-serial-number-of-android-device, Feb. 23, 2010, 6 Pages.
Egele, et al., "PiOS: Detecting Privacy Leaks in iOS Applications", In Proceedings of Network and Distributed Systems Security Symposium, Feb. 9, 2011, 15 Pages.
Begemann, Ole, "Udid Replacement APIs in iOS 6", Retrieved from http://oleb.net/blog/2012/09/udid-apis-in-os-6/>>, Sep. 20, 2012, 4 Pages.
Beede, et al., "MyShield: Protecting Mobile Device Data via Security Circles", In Technical Report, CU-CS-1091-12, University of Colorado Boulder, Jan. 2012, 14 Pages.

* cited by examiner

SELECTIVE FILE ACCESS FOR APPLICATIONS

BACKGROUND

An application contains executable program code that runs in a computer system, and is implemented to perform one or more tasks. A wide variety of types of programming languages exist that may be used to form program code for applications. Various types of applications exist for performing various functions, including office suite applications, desktop applications, mobile applications, web applications, etc. Some applications may access data stored in a file system of their host computer or other computer to be used when performing their functions. For instance, a word processing application may access text files or document files for editing. A media player application may access audio files and/or video files for playing. Database applications may access data in database files of a database for various uses.

However, because applications typically have access to file system data, including file system data unrelated to the applications, the opportunity exists for applications containing malicious program code to harm a wide variety file system data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for enabling selective file system access by applications. The access of file system data by an application is handled by a broker service. The application is otherwise prevented from being able to access file system data (other than its own files and others of its own resources). The broker service receives a request to access file system data from the application, and if the data requested to be accessed is of a file type that the application is allowed to access, the broker service enables the application to access the data. Otherwise, the application is denied or prevented access to the data.

According to one method implementation, an application is installed in a computing device. An application manifest associated with the application is received. The application manifest indicates one or more file types that the application is allowed to access. The indicated file type(s) are registered in a location accessible by a broker service.

Furthermore, the application may be launched as an application process. The application process is isolated in an application container, which is similar to a user account (where a user having a user account cannot access files of other users). The application container prevents direct access by the application process to file system data. An access request related to first data of the file system data is received at the broker service from the application process. Access by the application process to the first data is enabled when the broker service determines that a file type of the first data is included in the registered file type(s).

According to a system implementation, a computing device is provided. The computing device includes storage and processing logic. The storage stores an application installed in the computing device and an application manifest associated with the application. The application manifest indicates one or more file types that the application is allowed to access. The processing logic includes a broker service and registers the file type(s) in a location accessible by the broker service (and not by the application). The broker service is configured to limit access by the application to files of the registered file type(s).

The processing logic may initiate an application process when the application is launched, and may include the application process into an application container. The application container prevents direct access by the application process to file system data. The broker service receives an access request for first data of the file system data from the application process. The processing logic enables access by the application process to the first data when the broker service determines that a file type of the first data is included in the registered file type(s).

Additionally, described herein are computer-readable storage media that store program code/logic for enabling various embodiments, including enabling selective access to file system data by applications, and further embodiments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
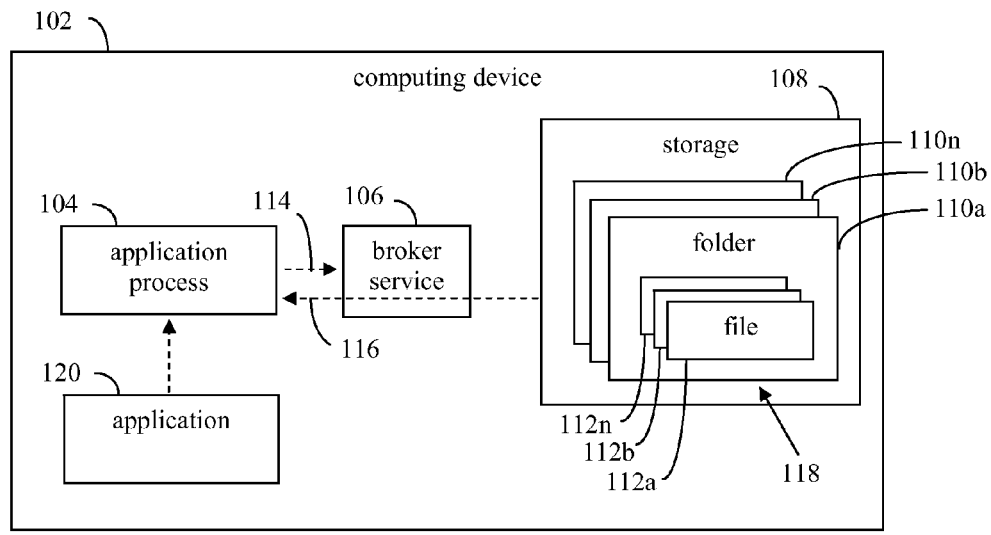
FIG. 1 shows a block diagram of a computing device configured to regulate access to file system data by applications, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

Embodiments relate to techniques for regulating/restricting/controlling access by applications to file system data. Applications may access data stored in the file systems of their host computer systems (and/or other computer systems) to perform their functions. For instance, a word processing application may access text files or document files for editing. A media player application may access audio files and/or video files for playing. Database applications may access data stored in a database for various uses. However, because applications can access file system data, which may include file system data unrelated to the applications, the opportunity exists for applications containing malicious program code to commit theft of file system data, to harm a wide variety file system data, or to commit other undesired acts.

Embodiments provide the benefit of restricting access to file system data by applications to the types of file system data that the applications are configured to interact with. For instance, a developer or other person may provide an indication of one or more file types that an application can access/interact with (e.g., read, write, modify, rename, copy, move, etc.). The file type(s) (e.g., MP3 files, Microsoft® Word files, etc.) may be registered when the application is installed in a computer system. When the application is executed and attempts to access file system data of the computer system, the application may be enabled to access the file system data if the file system data has a file type of the registered file type(s). If the file system data being accessed is not of the registered file type(s), the access of the file system data may be denied or prevented. The application may be enabled to access essential application information such as its own files and others of its own resources, a temporary working directory for the application, and a settings directory for the application, but may be otherwise denied access to sensitive file system data as described herein.

Embodiments may be implemented in a variety of environments. For instance, FIG. 1 shows a block diagram of a computing device 102, according to an example embodiment. As shown in FIG. 1, computing device 102 includes an application process 104, a broker service 106, storage 108, and an application 120. Furthermore, storage 108 includes a plurality of folders 110a-110n. Each of folders 110a-110n may include one or more files. For instance, folder 110a is shown including files 112a-112n. Folders 110a-110n and files 112a-112n are included in file system data 118 of a file system of computing device 102. Computing device 102 is further described as follows.

Computing device 102 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of mobile device.

As described above, computing device 102 includes storage 108. Storage 108 may include one or more of any type of storage mechanism to store folders and files, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. Storage 108 may be entirely local storage, as shown in FIG. 1, or may optionally include storage that is remote from computing device 102, including storage that is accessible over a network, such as "cloud" storage and storage available at media servers. Furthermore, storage 108 may include removable storage devices. As shown in FIG. 1, file system data 118 is stored in storage 108. Folders 110a-110n are virtual folders included in file system data 118, as would be known to persons skilled in the relevant art(s). Folders 110a-110n may be organized in a hierarchy and/or in any other arrangement. Any number of folders 110 may be present, including tens, hundreds, thousands, and even larger numbers of folders, and each folder 110 may include any number of files. Files 112a-112n are computer files that contain data, as would be known to persons skilled in the relevant art(s). Any number of files 112 may be present, including tens, hundreds, thousands, and even larger numbers of files.

Figure 2:
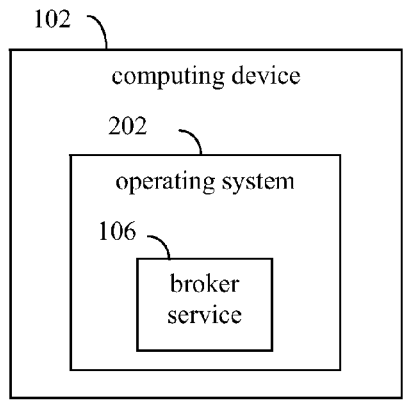
FIG. 2 shows a block diagram of a computing device, where a broker service is included in an operating system, according to an example embodiment.

Broker service 106 includes one or more processes (e.g., a "broker process") that may execute in computing device 102 (e.g., by one or more processors). Broker service 106 is configured to restrict access by applications to data of file system data 118 that the applications are allowed to access. The program code of broker service 106 may be standalone program code or may be included in other program code of computer device 102. For instance, FIG. 2 shows a block diagram of computing device 102, according to an example embodiment. As shown in FIG. 2, broker service 106 may be included in an operating system 202 of computing device 102. Optionally, broker service 106 may provide further services for computing device 102, including restricting access by applications to hardware and/or other resources of computing device 102.

Application 120 is a software application that executes/operates in computing device 102, and may be stored in storage of computing device 102 (e.g., storage 108). For example, application 120 may be an office suite application, desktop application, mobile application, web application, etc. Office suite applications include various types of productivity enhancing applications, such as word processing applications, spreadsheet applications, presentation applications, etc. Desktop applications include various types of applications that configured to operate in computer desktops (e.g., of desktop computers), including some office suite applications, desktop widgets or gadgets (interactive tools that typically provide single purpose services, such as news streaming, providing the current weather, showing current stock quotes, etc.), web browsers, etc. Mobile applications include various types of applications (e.g., "Apps") that operate in mobile, handheld devices such as smart phones, tablet computers, portable media players, personal digital assistants (PDAs), etc. Web applications (also known as a "web apps" or "webapps") are applications that are accessible over a network such as the Internet or an intranet, and may be hosted in a web browser that renders the application. Example applications include social networking applications, navigational assistance applications (e.g., mapping applications, restaurant locating applications, traffic applications, etc.), gaming applications, financial planning applications, etc.

Application 120 may be executed to spawn one or more application instances or "processes", such as application process 104. Application process 104 includes program code (instructions) of application 120 and its current activity. Application process 104 executes in one or more processors of computing device 102. Application process 104 may include one or more execution threads. When multiple execution threads are present, the threads may execute program code concurrently.

During execution of application process 104, application process 104 may attempt to access data of file system data 118, such as file 112*a*. According to conventional systems, application process 104 may be enabled to access file 112*a* with few restrictions. However, application process 104 may include malicious program code (e.g., by original design of application 120, by virus code being inserted into application 120, etc.) or may be able to access file 112*a* in a manner that a user of application 120 does not expect. In either case, application process 104 may cause harm by being enabled to access file 112*a*.

Embodiments aid in reducing harm caused by malicious application code by restricting access to file system data. According to an embodiment, application process 104 may generate a data access 114 that indicates data of file system data 118 desired to be accessed, which in the current example is file 112*a*. As shown in FIG. 1, data access 114 is received by broker service 106. Broker service 106 is configured to determine whether file 112*a* is of a file type that application 120 is allowed to access. Broker service 106 may enable application process 104 to access file 112*a* if file 112*a* is of a file type that application 120 is allowed to access. In such case, as shown in FIG. 1, the data requested in data access 114 may be provided from storage 108 to application process 104 through broker service 106 as response data 116, or response data 116 may indicate a manner in which application process 104 may access the data. For instance, a handle to a file or folder may be passed to application process 104 in response data 116 to enable application 104 to access the file or folder. Otherwise, broker service 106 may deny access to file 112*a* if file 112*a* has a file type that application 120 is not allowed to access. Broker service 106 may deny various interactions with files and folder by application process 104 when not allowed access, including denying access by application process 104 to read a file, to read contents of a folder, to write to a file or folder, to rename a file or folder, to move a file or folder, or to copy over a file or folder of the first data.

Figure 3:
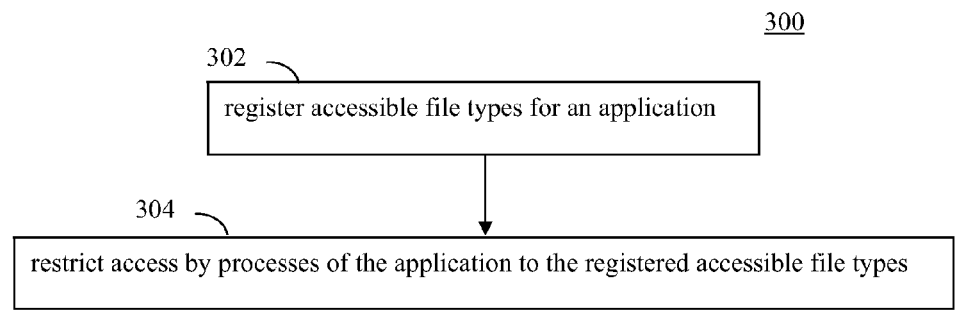
FIG. 3 shows a flowchart providing a process for regulating access to file system data by applications, according to an example embodiment.

Computing device 102 may operate in various ways to perform its functions. For instance, FIG. 3 shows a flowchart 300 providing a process for regulating access to file system data by applications, according to an example embodiment. Flowchart 300 is described as follows with reference to FIG. 1. Further structural and operational embodiments will be apparent to persons skilled in the relevant art(s) based on the following discussion regarding flowchart 300.

Flowchart 300 begins with step 302. In step 302, accessible file types for an application are registered. For example, in an embodiment, one or more file types that application processes of application 120 are allowed to access are registered in a data structure (e.g., a registry) of computing device 102. The data structure may be stored in storage 108 or other storage associated with computing device 102.

In step 304, access by processes of the application is restricted to the registered accessible file types. For instance, in an embodiment, broker service 106 may have access to the data structure containing the registered accessible file types for application 120. When broker service 106 receives requests for data from an application process of application 120, such as application process 104, broker service 106 may access the data structure to determine whether the requested data is of a file type that the application process is allowed to access. Broker service 106 may enable the application process to access the data if it is an allowable file type, or may deny access to the request if the data is not of an allowable file type. Any number of application processes that are formed from application 120 may have their file system data access restricted in this manner, even simultaneously.

Computing device 102, including broker service 106, may perform its functions in various ways, in embodiments. Numerous exemplary embodiments for computing device 102, broker service 106, and flowchart 300 are described in the following subsections. For instance, the next subsection describes example embodiments for installing an application configured for controlled access to file system data. The subsequent subsection describes example embodiments for launching an application having controlled file system data access, followed by a section describing example embodiments for providing restricted access to file system data to the launched application.

A. Example Embodiments for Installing an Application for Controlled File System Data Access According to an example embodiment, an application may be installed in a computing device to have controlled access to file system data. In an embodiment, as part of the installation, a developer or other user is enabled to register accessible file types for their application at one or more secure locations. The secure location(s) may subsequently be accessed by a broker service to enable access to the file system data by the application. However, the secure location(s) may not be accessed by the application. In this manner, the accessible file types for the application may not be tampered with to enable the application to cause harm to the file system.

Figure 4:
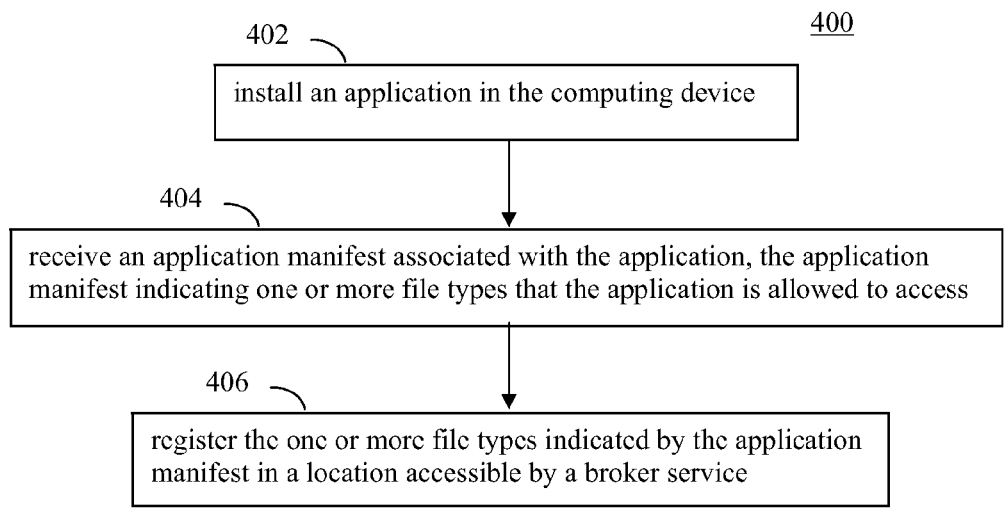
FIG. 4 shows a flowchart providing a process for installing and configuring an application for controlled access to file system data, according to an example embodiment.
Figure 5:
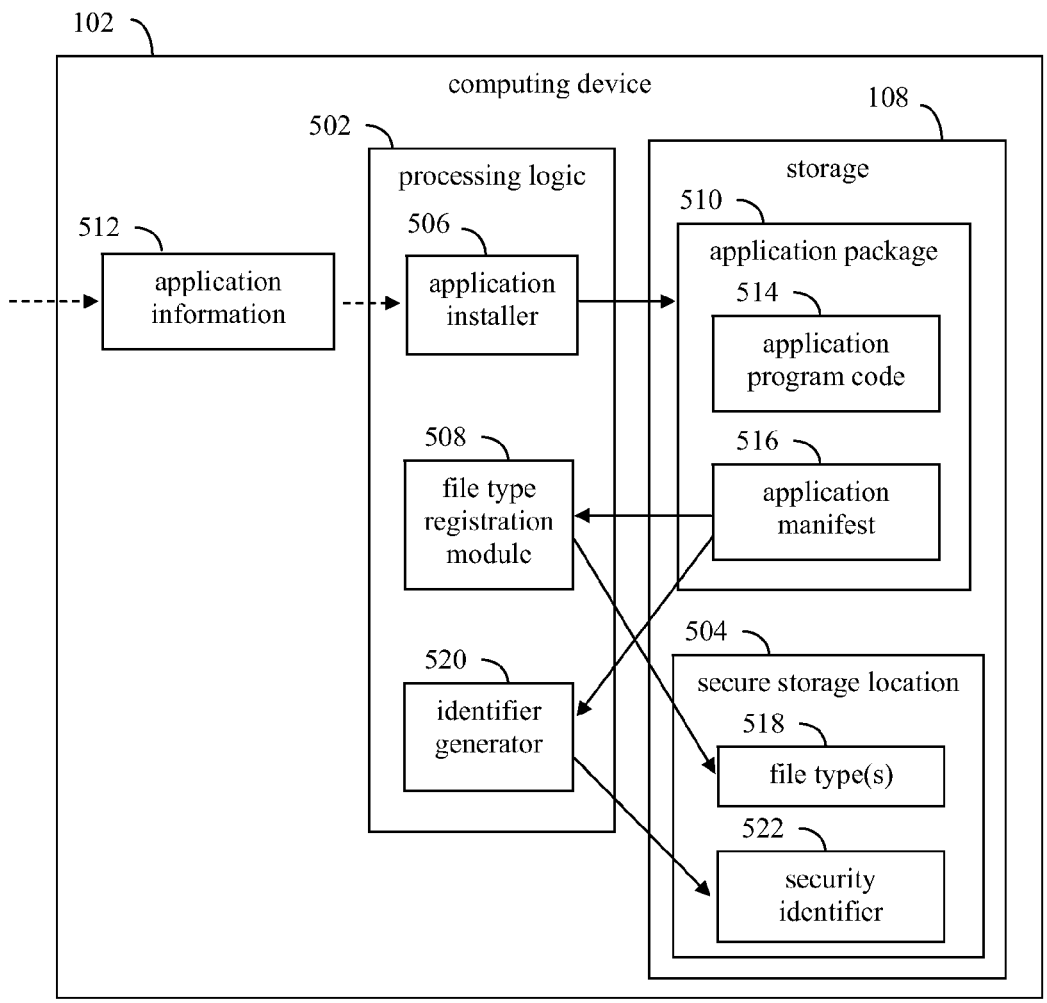
FIG. 5 shows a block diagram of a computing device where an application is installed and configured for controlled access to file system data, according to an example embodiment.

For instance, FIG. 4 shows a flowchart 400 providing a process for installing and configuring an application for controlled access to file system data, according to an example embodiment. Flowchart 400 provides an example implementation of step 302 of flowchart 300 in FIG. 3. Flowchart 400 may be performed by computing device 102 of FIG. 1, in an embodiment. Flowchart 400 is described as follows with reference to FIG. 5. FIG. 5 shows a block diagram of computing device 102, where an application is installed and configured for controlled access to file system data, according to an example embodiment. As shown in FIG. 5, computing device 102 includes processing logic 502 and storage 108. Processing logic 502 includes an application installer 506, a file system registration module 508, and an identifier generator 520. Further structural and operational embodiments will be apparent to persons skilled in the relevant art(s) based on the following discussion regarding flowchart 400 and computing device 102 of FIG. 5.

Flowchart 400 begins with step 402. In step 402, an application is installed in the computing device. For example, as shown in FIG. 1, application information 512 may be received at computing device 102. Application information 512 includes all of the files and/or data that define an application, such as application 120 of FIG. 1. Application information 512 can be received from a variety of sources, including from a computer-readable storage medium (e.g., a compact disc read only memory (CDROM) device, a floppy disk, a memory stick (e.g., a universal serial bus (USB) storage device), etc.) associated with (e.g., inserted in a disc drive, plugged into a connector, etc.) computing device 102, from a remote service over a network such as a LAN (local area network), a WAN (wide area network), or a combination of networks such as the Internet (e.g., a "cloud"-based service), and/or from other source.

As shown in FIG. 5, application installer 506 receives application information 512. Application installer 506 is configured to install application information 512 in storage 108 of computing device 102 to install the application. Application installer 506 may be a proprietary or commercially available application installation program, including being an application installation program that is known to persons skilled in the relevant art(s), and that is configured to install applications as described herein.

As shown in FIG. 5, application installer 506 processes application information 512 to install the application as an application package 510 in storage 108. Application package 510 includes an application program code 514. Application program code 514 is executable code (by one or more processors) that defines the functions of the installed application. Application program code 514 may have the form of one or more files and/or other forms. Application installer 506 is configured to install application program code 514 in computing device 102.

Referring back to FIG. 4, in step 404, an application manifest associated with the application is received, the application manifest indicating one or more file types that the application is allowed to access. For example, as shown in FIG. 5, application package 510 further includes an application manifest 516. Application manifest 516 is an object (e.g., one or more files). Application installer 506 is configured to store application manifest 516 in storage 108 of computing device 102.

Figure 6:
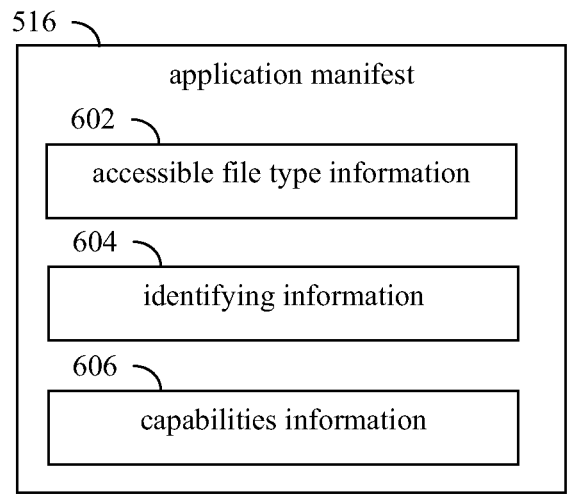
FIG. 6 shows a block diagram of an application manifest, according to an example embodiment.

Application manifest 516 includes an indication of one or more file types that the application is allowed to access. Furthermore, application manifest 516 may optionally include further information associated with the application. For instance, FIG. 6 shows a block diagram of application manifest 516, according to an example embodiment. As shown in FIG. 6, application manifest 516 includes accessible file type information 602, identifying information 604, and capabilities information 606. In other embodiments, application manifest 516 may include additional and/or alternative information than shown in FIG. 6.

Accessible file type information 602 includes an indication of one or more file types that the associated application is allowed to access. "File types" define and distinguish between classes of files, such as by file extension, file kind, and/or other file attributes or metadata. As such, file type information 602 may indicate one or more file types (by file extension, file kind, and/or other file attributes or metadata) that may be used to define data (e.g., files, folders, etc.) that may be accessed by an application. File types may be indicated in accessible file type information 602 in various ways. For instance, file types may be indicated in accessible file type information 602 as individual file types and/or in groups of file types, such as file type families and/or file type classes. File types may be indicated in accessible file type information 602 by file extensions, which typically are several alphanumeric characters following a last period in a file name. For instance, with regard to individual file types, a file type extension for a text file may be ".txt", a file type extension for an MPEG (moving pictures experts group) video file may be ".mpg", a file type extension for a waveform audio file format audio file may be ".wav", etc. A file type family includes multiple file types (e.g., by corresponding file extensions) that are related in a family, such as a group of file types for a common product (e.g., different file types associated with different versions of the product). For example, a Microsoft® Word (word processing application) file type family may include the file type extensions ".doc" and ".docx", which relate to pre-Microsoft® Word 2007 versions and to Microsoft® Word 2007 and subsequent versions, respectively. A file type class includes multiple file types that are related by product class, such as an audio class, a video class, a word processing class, a database class, etc. For instance, a music or audio class file type may include multiple file extensions associated with music and/or audio such as ".wav", ".mp3", ".aiff", etc.

Identifying information 604 includes identifying information for the application. For instance, identifying information 604 may include one or more of a name of the application and/or of the application package, a publisher of the application, an architecture of the application, a resource type (e.g., a language type such as en-us, etc.), a version of the application, and/or other identifying information.

Capabilities information 606 indicates capabilities of computing device 102 that an application process formed through execution of the application program code 514 is permitted and/or not permitted to access. Examples of such indicated capabilities include indicating whether storage devices of computing device 102 can be accessed (e.g., internal and/or external storage devices), indicating whether credentials may be accessed, indicating whether software and/or hardware certificates may be accessed, indicating whether input/output devices (e.g., microphones, webcams, etc.) can be accessed, indicating whether communications with entities remote from computing device 102 may be performed, etc. Capabilities information 606 is optionally present, and is an example way that an application can access data. For instance, an indicated capability may represent all file types for a particular location (e.g., a picture library) to which broker service 106 may enable access.

Referring back to FIG. 4, in step 406, the one or more file types indicated by the application manifest is/are registered in a location accessible by a broker service. For example, in an embodiment, as shown in FIG. 5, file type registration module 508 may read application manifest 516 to determine the one or more file types that the application is allowed to access (e.g., as indicated in accessible file type information 602). File type registration module 508 is configured to register the one or more file types by storing indications of the one or more file types in a secure storage location 504 as file type(s) 518. As shown in FIG. 5, secure storage location 504 may be a storage location (e.g., a region of storage) of storage 108, or alternatively, may be in a separate storage. Secure storage location 504 is considered secure (e.g., privileged) because application processes of the application cannot access data stored therein. As such, a malicious application cannot modify file type(s) 518 to be enabled to access file types other than those defined in file type(s) 518, reducing the potential for the malicious application to cause harm to file system data.

Furthermore, as shown in FIG. 6, identifier generator 520 receives information from application manifest 516 and may generate a security identifier 522. Security identifier 522 is a unique identifier that may be used to identify the application associated with application package 510, including application processes that are executed for the application, in computing device 102. A security identifier 522 is similar to a user identifier for a user account, which limits access by a first user having a first user account from accessing files of a second user. A security identifier 522 may be used to ensure an application does not have access to data of a file system by default, and to associate a set of file types and/or capabilities with an application package. For instance, security identifier 522 may be used to identify application processes with regard to security operations in computing device 102 including access control lists (ACLs). An ACL of computing device 102 that includes security identifier 522 may identify resources of computing device 102 that the associated application may access. If security identifier 522 is not included in an ACL, the application does not have access to any resources for which security is handled by the ACL.

Security identifier (SID) 522 may be generated for an application in any manner, including according to proprietary techniques and/or commercially available techniques. For instance, security identifier 522 may be generated based on the package identifier of application package 510 (a package identifier SID). Generating security identifier 522 based on the package identifier may include generating a security identifier based on all elements of the package identifier of application package 510, or based on only a subset of the elements (e.g., the family identifier of the package—the name and publisher from the package identifier). In another embodiment, security identifier 522 may be generated as a hash of information from identifying information 604. For instance, security identifier 522 may be generated as a hash of one or more of a name of the application and/or of application package 510, a publisher of the application, an architecture of the application, a version of the application, etc.

B. Example Embodiments for Launching an Application Having Controlled File System Data Access According to an example embodiment, an application process may be launched for an application that has allowable file types defined and registered at computing device 102. In an embodiment, the application process may be included into an application container that prevents access by the application process to file system data.

Figure 7:
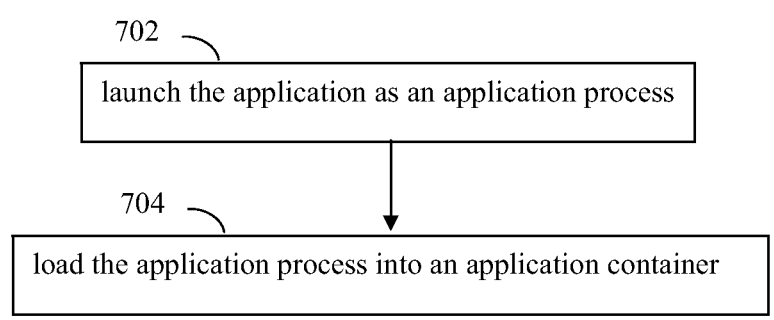
FIG. 7 shows a flowchart providing a process for launching an application in an application container, according to an example embodiment.
Figure 8:
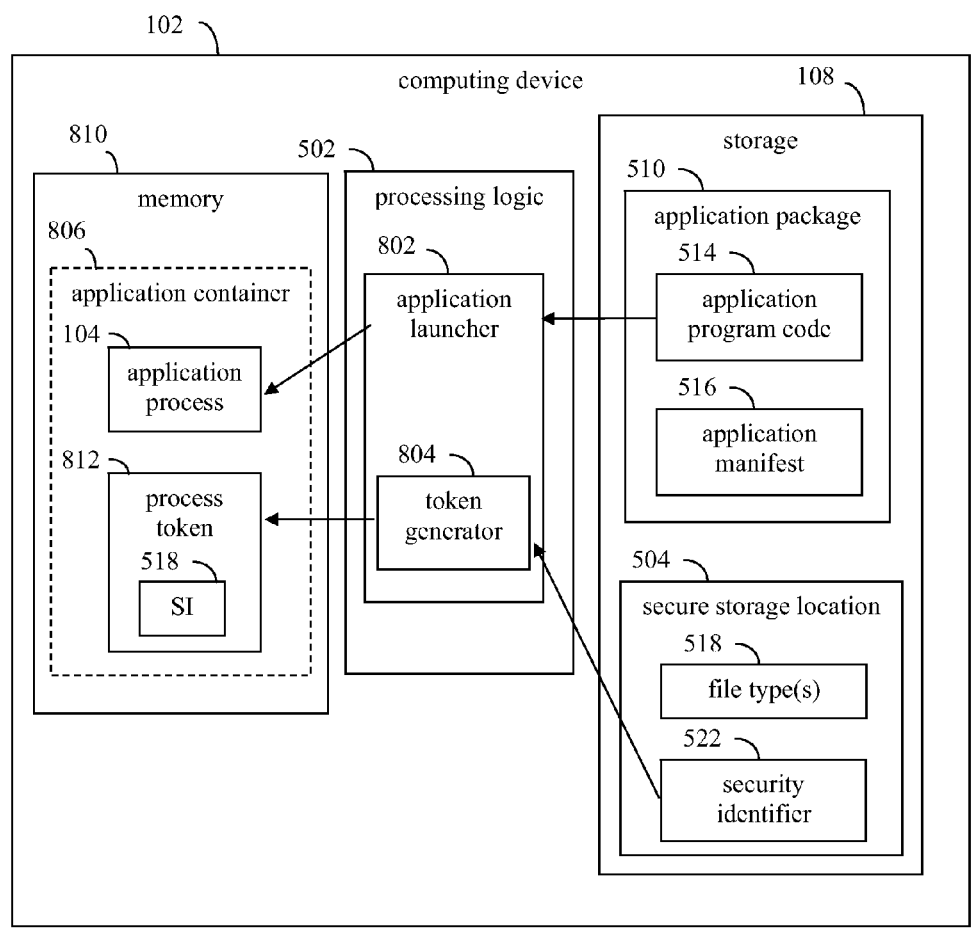
FIG. 8 shows a block diagram of a computing device where an application is launched in an application container, according to an example embodiment.

For instance, FIG. 7 shows a flowchart 700 providing a process for launching an application having controlled access to file system data, according to an example embodiment. Flowchart 700 may be performed by computing device 102 of FIG. 1, in an embodiment. Flowchart 700 is described as follows with reference to FIG. 8. FIG. 8 shows a block diagram of computing device 102, where an installed application is launched, and the resulting application process has controlled access to file system data, according to an example embodiment. As shown in FIG. 8, computing device 102 includes processing logic 502, storage 108, and memory 810. Processing logic 502 includes an application launcher 802, and application launcher 802 includes a token generator 804. Further structural and operational embodiments will be apparent to persons skilled in the relevant art(s) based on the following discussion regarding flowchart 700 and computing device 102 of FIG. 8.

Flowchart 700 begins with step 702. In step 702, the application is launched as an application process. For example, as shown in FIG. 8, application launcher 802 may be configured to launch an application, such as application 120 of FIG. 1, to form an application process 104. Application launcher 802 may be configured to launch application 120 to form application process 104 in various ways, including according to proprietary techniques, or according to conventional techniques known to persons skilled in the relevant art(s). As shown in FIG. 8, application process 104 may be loaded into memory 810. In this manner, program code of application process 104 may be readily accessed by one or more processors of computing device 102 that execute application process 104.

In step 704, the application process is included into an application container. For example, as shown in FIG. 8, application process 104 is included in an application container 806. Application container 806 is a virtual container for application process 104 that prevents direct access by application process 104 to file system data. An application container 806 for an application is similar to a user account for a user, where user accounts are used to restrict access by users to information of other users. In a similar manner, application container 806 restricts access by an application to other information. Application process 104 may be "included" in application container 806 in various ways, such as by having a security identifier associated with application container 806 applied to a token for application process 104 that restricts, by default, access by application process 104 to sensitive portions of a file system. Such sensitive file system portions do not include essential files/folder for application process 104 itself, such as resources of application package 510, a working directory, and a settings directory. ACLs may be set appropriately so that application process 104 can access these essential items.

For instance, in an embodiment, security identifier 522 generated for application 120 (e.g., as described above) may be associated with application container 806, and used to define access restrictions for application container 806.

Accessible resources defined for security identifier 522 (e.g., in one or more ACLs), are applicable to application container 806, and therefore to application process 104 in application container 806. For instance, in an embodiment, security identifier 522 may not be included in any ACLs associated with file system data. As such, application container 806, and therefore application process 104, may be disabled from having direct access to file system data. In this manner, application container 806 isolates application process 104 from file system data. Instead, application process 104 is restricted to accessing file system data through broker service 106, according to embodiments described herein. As described elsewhere herein in further detail, broker service 106 controls which types of file system data that application process 104 may access.

As shown in FIG. 8, token generator 804 may receive security identifier 522 associated with application container 806, and may generate a process token 812 for application process 104. Process token 812 may be used to uniquely identify application process 104 in computing device 102. For instance, process token 812 may be capable of distinguishing application process 104 from other types of application processes, as well as from additional instances of application process 104 generated for the same application 120.

Token generator 804 may be configured to generate process token 812 to include security identifier 522, which identifies application container 806, and may include further information associated with application manifest 516. For instance, process token 812 may optionally include further security identifiers that are generated from information of application manifest 516 for application 120, including one or more security identifiers generated based on capabilities information 606, etc.

Note that in an embodiment, process token 812 is unmodifiable by application process 104. For instance, process token 812 may be stored in a secure location in memory 810, in secure storage location 504, or other secure storage location. In this manner, application process 104 cannot modify security identifiers of process token 812 to be enabled to access otherwise inaccessible file system data, and is thereby prevented from being enabled to cause harm to the file system. Memory 810 may include any number of memory devices, such as random access memory (RAM) devices, and may be included in or separate from storage 108.

C. Example Embodiments for Providing Access to File System Data to a Launched Application According to an example embodiment, an application process may be provided with access to file system data. In an embodiment, the application process cannot directly access file system data due to being included in an application container, which has restricted file system access due to its associated security identifier. Instead, the application process is enabled to access file system data indirectly, by accessing file system data through an intermediary—a broker service.

Figure 9:
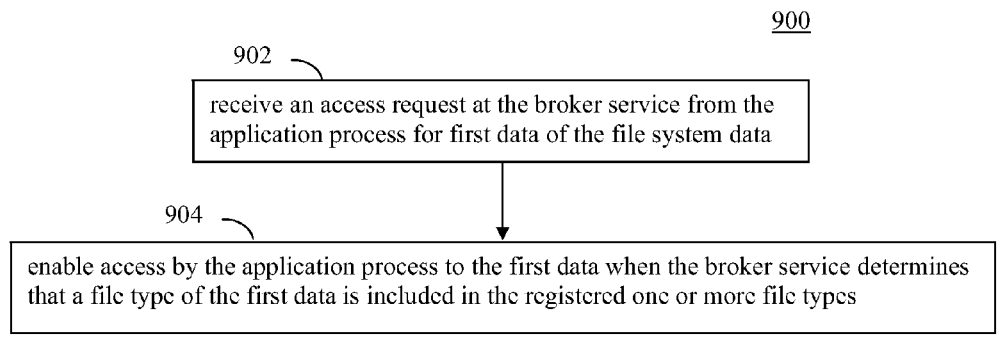
FIG. 9 shows a flowchart providing a process for using a broker service to control access to file system data by an application process, according to an example embodiment.
Figure 10:
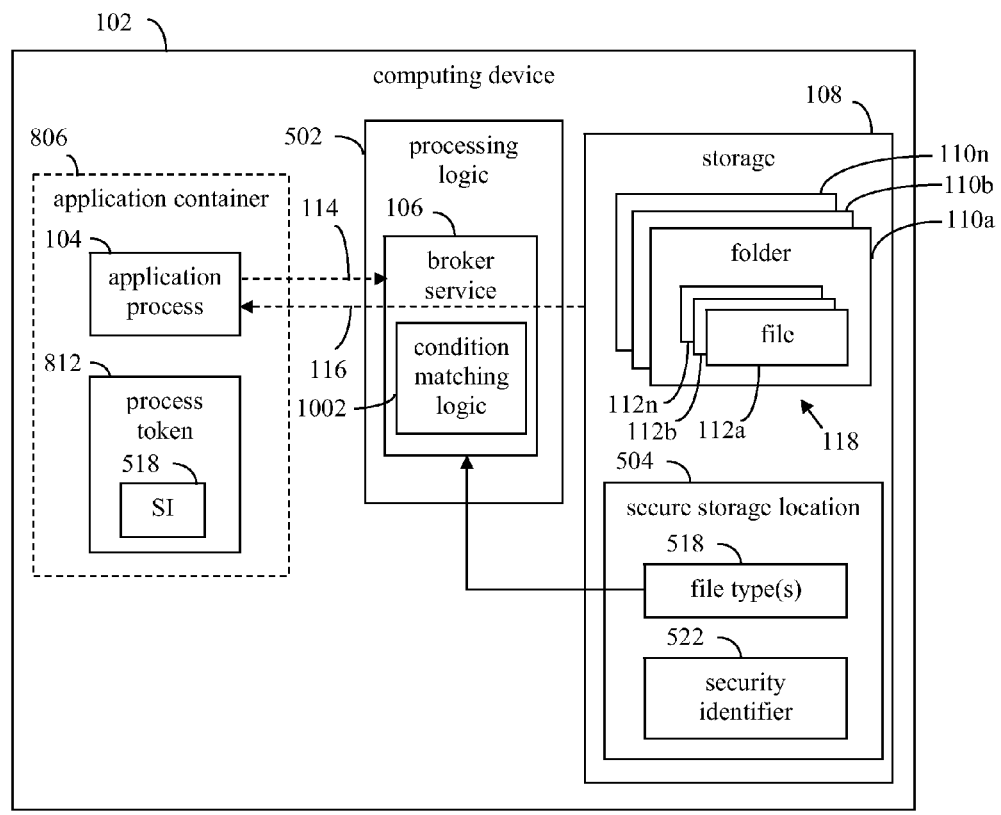
FIG. 10 shows a block diagram of a computing device where a broker service controls access to file system data by an application process, according to an example embodiment.

For instance, FIG. 9 shows a flowchart 900 providing a process for providing controlled access to file system data to an application process, according to an example embodiment. Flowchart 900 may be performed by computing device 102 of FIG. 1, in an embodiment. Flowchart 900 is described as follows with reference to FIG. 10. FIG. 10 shows a block diagram of computing device 102, where an installed application was previously launched, and the resulting application process is provided with controlled access to file system data, according to an example embodiment. As shown in FIG. 10, computing device 102 includes processing logic 502 and storage 108. Processing logic 502 includes broker service 106, and broker service 106 includes condition matching logic 1002. Further structural and operational embodiments will be apparent to persons skilled in the relevant art(s) based on the following discussion regarding flowchart 900 and computing device 102 of FIG. 10.

Flowchart 900 begins with step 902. In step 902, an access request is received at the broker service from the application process for first data of the file system data. For example, as shown in FIG. 10, application process 104 generates data access 114, which indicates the data of file system data 118 that is desired to be accessed. In embodiments, data access 114 may indicate that data is to be read, to be written, or to be modified. For instance, in the current example, data access 114 may indicate that file 112a is to be read. Data access 114 may also include process token 812 to identify data access 114 as having been generated by application process 104. As shown in FIG. 10, data access 114 is received by broker service 106.

In step 904, access by the application process to the first data is enabled when the broker service determines that a file type of the first data is included in the registered one or more file types. Broker service 106 is configured to determine whether file 112a is of a file type that application process 104 is allowed to access. For instance, broker service 106 may enable application process 104 to access file 112a if file 112a has a file type that application process 104 is allowed to access. Otherwise, broker service 106 may deny access by application process 104 to file 112a if file 112a has a file type that application process 104 is not allowed to access.

Figure 11:
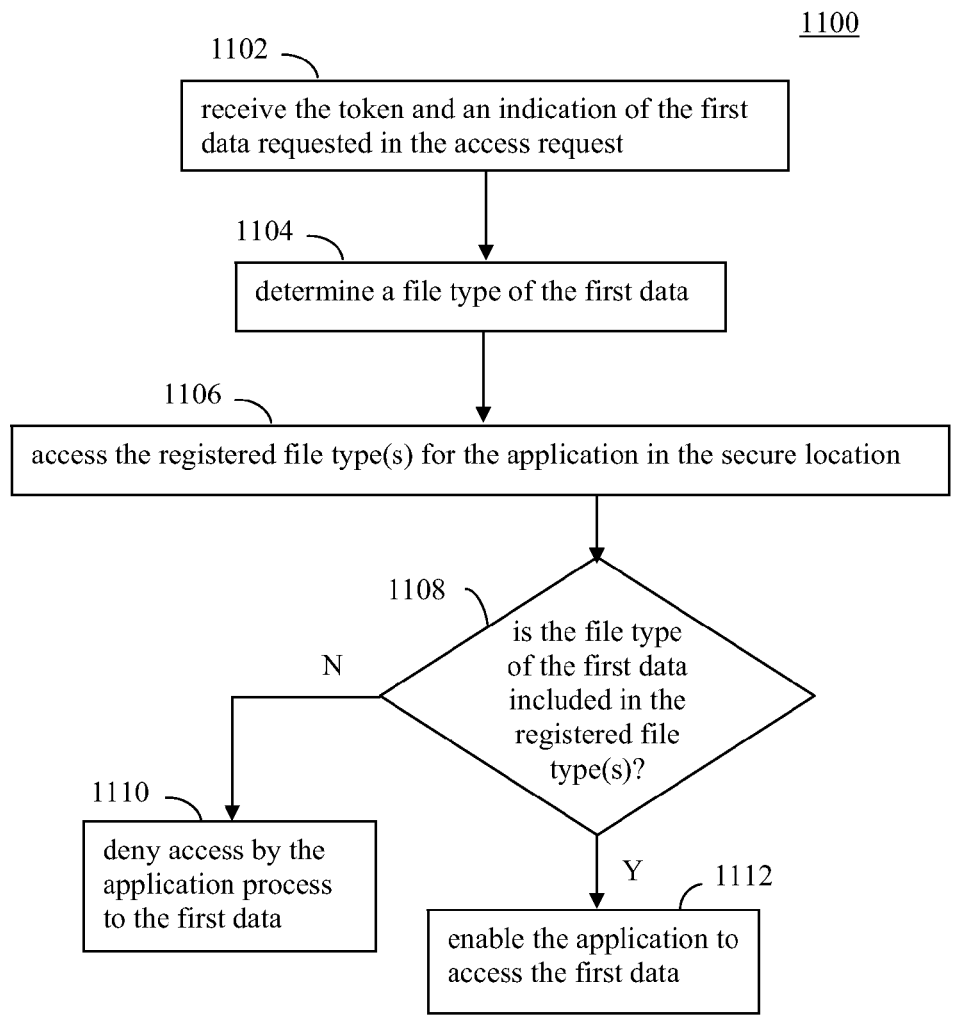
FIG. 11 shows a flowchart providing a process for using a broker service to control access to file system data by an application process, according to an example embodiment.

In an embodiment, broker service 106 may perform flowchart 900 according to FIG. 11. FIG. 11 shows a flowchart 1100 providing a process for using a broker service to control access to file system data by an application process. Further structural and operational embodiments will be apparent to persons skilled in the relevant art(s) based on the following discussion regarding flowchart 1100.

Flowchart 1100 begins with step 1102. In step 1102, the token and an indication of the first data requested in the access request is received. For example, as described above, broker service 106 may receive data access 114, which indicates data of file system data 118 desired to be accessed, and includes process token 812 to identify application process 104. Operation proceeds from step 1102 to step 1104.

In step 1104, a file type of the first data is determined. For example, based on the data request indicated in data access 114, broker service 106 may determine a file type of the requested data. Broker service 106 may determine the file type of the requested data by a file extension of the requested data included in data access 114 (e.g., an extension such as .txt, .wav, .mpeg, etc.), by accessing the requested data in storage 108 to determine the file extension of the requested data, and/or by other technique. Operation proceeds from step 1104 to step 1106.

In step 1106, the registered file type(s) for the application is/are accessed in the secure location. For instance, in an embodiment, broker service 106 may determine the security identifier 522 of application process 104 included in data access 114. Broker service 106 may identify file type(s) 518 for application process 104 stored in secure storage location 504 by their association with the determined security identifier 522. Broker service 106 may retrieve the identified file type(s) 518 from secure storage location 504. Operation proceeds from step 1106 to step 1108.

In step 1108, whether the file type of the first data is included in the registered file type(s) is determined. For instance, in an embodiment, condition matching logic 1002 of broker service 106 is configured to determine whether the determined file type of the requested data (determined in step 1104) matches a condition with regard to file type(s) 518 (accessed in step 1006). For instance, condition matching logic 1002 may determine whether the determined file type of the requested data is equal to a file type included in file type(s) 518. If the file type of the requested data is not included in the registered file type(s), operation proceeds from step 1108 to step 1110. If the file type of the requested data is included in the registered file type(s), operation proceeds from step 1108 to step 1112.

In step 1110, access by the application process to the first data is denied. When the file type of the requested data is determined to not be equal to one of file type(s) 518, access by application process 104 to the requested data may be denied by broker service 106. For instance, if application process 104 is requesting specific data (e.g., a particular file, etc.), application process 104 may be prevented from accessing the specific data, and a denial of data access 114 may be indicated by broker service 106 to application process 104. In another example, if application process 104 is requesting an indication of the contents of a particular folder, the files of the folder having inaccessible file types may not be made visible to application process 104 by broker service 106. Operation of flowchart 1100 is complete after step 1110 is performed.

In step 1112, the application is enabled to access the first data. When the file type of the requested data is determined to be equal to one of file type(s) 518, access by application process 104 to the requested data may be granted by broker service 106, and the requested data may be provided to application process 104 by broker service 106 in response data 116. Note that in an embodiment, application process 104 may be provided response data 116 by broker service 106, rather than being enabled to receive response data 116 directly from storage 108. In this manner, a security/privilege level of application process 104 does not have to be raised in order for application process 104 to receive response data 116. Operation of flowchart 1100 is complete after step 1112 is performed.

For instance, in one example provided for illustrative purposes, application process 104 may send data access 114 to request a file having a filename/path of c:/home/user/userfile.doc. Broker service 106 may receive data access 114, which includes the filename/path and security identifier 522 for application container 806/application process 104. Broker service 106 may determine that the file type of this filename/path is ".doc". Broker service 106 may access file type(s) 518 associated with security identifier 522 for application container 806/application process 104. In this example, file type(s) 518 may include the file extensions of ".doc", ".docx", ".txt", and d". Condition matching logic 1002 may determine that the file type of ".doc" for the requested data is equal to a file extension of file type(s) 518. As such, broker service 106 may provide the file having the filename/path of c:/home/user/userfile.doc to application process 104 in response data 116.

Accordingly, various features and benefits are provided by embodiments. For instance, broker service 106 provides a file system abstraction for application processes that are included in an application container. Broker service 106 uses statically declared file types to limit data access by application processes. When installed, the declared file types are registered with broker service 106. The isolated application process (in an application container) uses security identifiers to communicate to broker service 106 that the application process has access to discrete portions of the file system (e.g., document libraries, removable storage, etc.). In this manner, filtered access to file system data for applications is provided. Note that an instance of broker service 106 may be provided for each user at computing device 102 (such that multiple broker services 106 may be present), or a single broker service 106 may handle all of the users. Broker service 106 may be configured to handle a single application or to handle multiple applications simultaneously.

III. Example Computing Device Embodiments

Broker service 106, processing logic 502, application installer 506, file type registration module 508, identifier generator 520, application launcher 802, token generator 804, condition matching logic 1002, flowchart 300, flowchart 400, flowchart 700, flowchart 900, and flowchart 1100 may be implemented in hardware, software, firmware, or any combination thereof. For example, broker service 106, processing logic 502, application installer 506, file type registration module 508, identifier generator 520, application launcher 802, token generator 804, condition matching logic 1002, flowchart 300, flowchart 400, flowchart 700, flowchart 900, and/or flowchart 1100 may be implemented as computer program code configured to be executed in one or more processors. Alternatively, broker service 106, processing logic 502, application installer 506, file type registration module 508, identifier generator 520, application launcher 802, token generator 804, condition matching logic 1002, flowchart 300, flowchart 400, flowchart 700, flowchart 900, and/or flowchart 1100 may be implemented as hardware logic/electrical circuitry. For instance, in an embodiment, one or more of broker service 106, processing logic 502, application installer 506, file type registration module 508, identifier generator 520, application launcher 802, token generator 804, condition matching logic 1002, flowchart 300, flowchart 400, flowchart 700, flowchart 900, and/or flowchart 1100 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 12:
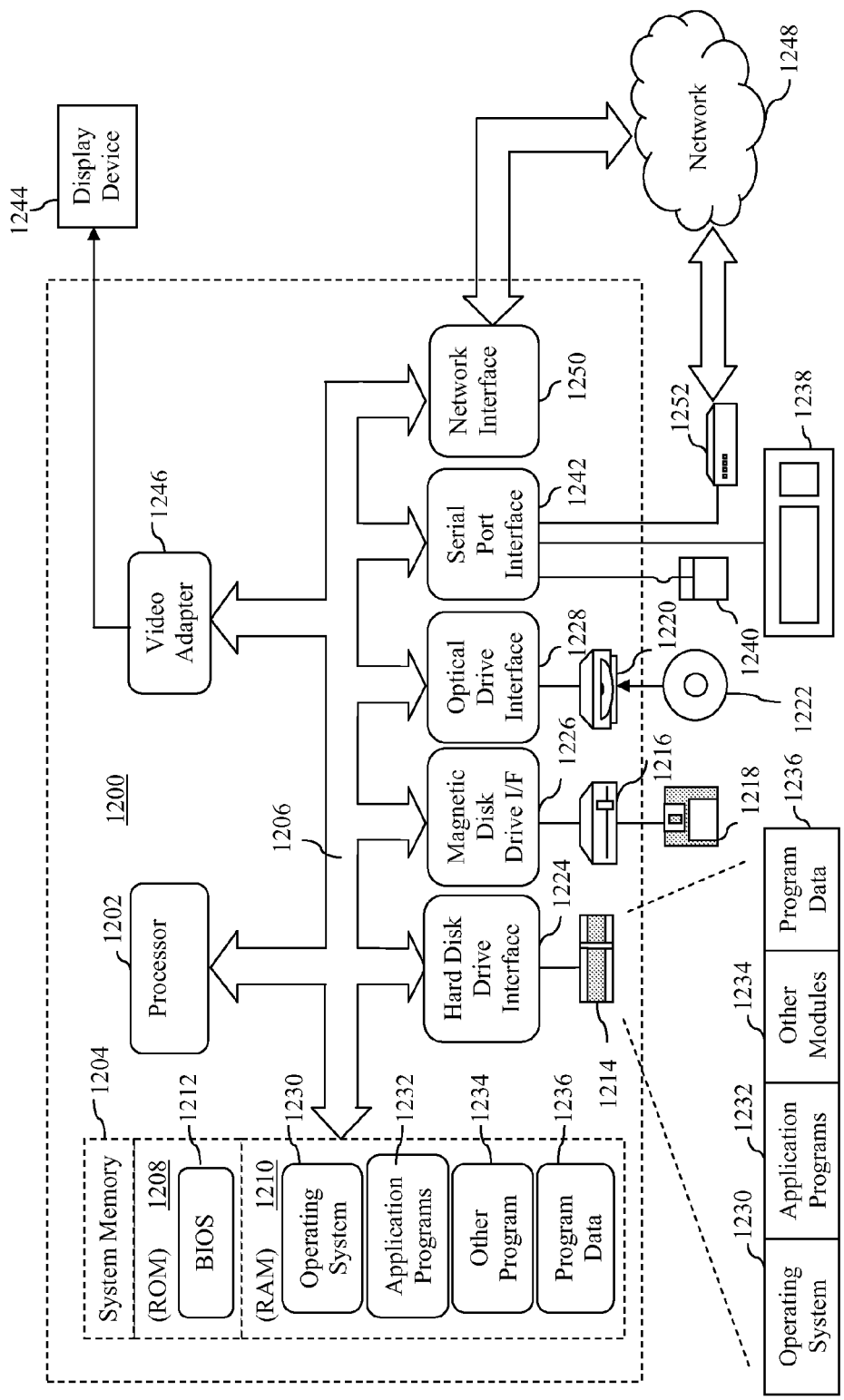
FIG. 12 shows a block diagram of an example computer that may be used to implement embodiments of the present invention.

FIG. 12 depicts an exemplary implementation of a computer 1200 in which embodiments of the present invention may be implemented. For example, computing device 102 may be implemented in a computer system similar to computer 1200, including one or more features of computer 1200 and/or alternative features. Computer 1200 may be a general-purpose computing device in the form of a conventional personal computer, a mobile computer, a server, or a workstation, for example, or computer 1200 may be a special purpose computing device. The description of computer 1200 provided herein is provided for purposes of illustration, and is not intended to be limiting. Embodiments of the present invention may be implemented in further types of computer systems, as would be known to persons skilled in the relevant art(s).

As shown in FIG. 12, computer 1200 includes one or more processors 1202, a system memory 1204, and a bus 1206 that couples various system components including system memory 1204 to processor 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic (e.g., computer program code) for implementing broker service 106, processing logic 502, application installer 506, file type registration module 508, identifier generator 520, application launcher 802, token generator 804, condition matching logic 1002, flowchart 300, flowchart 400, flowchart 700, flowchart 900, and/or flowchart 1100 (including any step of flowcharts 300, 400, 700, 900, and 1100), and/or further embodiments described herein.

A user may enter commands and information into the computer 1200 through input devices such as keyboard 1238 and pointing device 1240. Other input devices (not shown) may include a microphone, joystick, game pad, satellite dish, scanner, or the like. These and other input devices are often connected to processor 1202 through a serial port interface 1242 that is coupled to bus 1206, but may be connected by other interfaces, such as a parallel port, game port, or a universal serial bus (USB).

A display device 1244 is also connected to bus 1206 via an interface, such as a video adapter 1246. In addition to the monitor, computer 1200 may include other peripheral output devices (not shown) such as speakers and printers.

Computer 1200 is connected to a network 1248 (e.g., the Internet) through an adaptor or network interface 1250, a modem 1252, or other means for establishing communications over the network. Modem 1252, which may be internal or external, is connected to bus 1206 via serial port interface 1242.

As used herein, the terms "computer program medium," "computer-readable medium," and "computer-readable storage medium" are used to generally refer to media such as the hard disk associated with hard disk drive 1214, removable magnetic disk 1218, removable optical disk 1222, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments of the present invention discussed herein. Accordingly, such computer programs represent controllers of the computer 1200.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a broker service operating in a computing device, comprising:
    receiving, at the computing device, an access request related to first data of a file system in the computing device containing data from an application process, the application process being a launched version of an application, the application process residing in an application container that prevents direct access by the application process to the file system, the access request including a token for the application process that includes an identifier for the application container and an indication of the first data requested in the access request; and
    enabling access by the application process to the first data, through the broker service that is operating in the computing device by retrieving the first data from a file storage of the file system, when the broker service determines that a file type of the first data is included in one or more file types registered for the application as file types currently associated with the application that the application is allowed to access, the one or more file types read from an application manifest received during an installation of the application process, and indications of the one or more file types stored in a secure location in the computing device accessible to the broker service and not accessible by the application.

2. The method of claim 1, wherein the one or more file types include one or more file extensions, file kinds, or other file attributes or metadata, wherein said enabling comprises:
   accessing the registered one or more file extensions, file kinds, or other file attributes or metadata in the secure location accessible by the broker service and not accessible by the application process.

3. The method of claim 1, wherein said enabling access by the application process comprises:
   determining a file type of the first data based on the indication of the first data requested in the access request;
   accessing the registered one or more file types for the application in the secure location;
   determining whether the file type of the first data is included in the registered one or more file types; and
   enabling the application process to access the first data when the file type of the first data is determined to be included in the registered one or more file types.

4. The method of claim 3, wherein said enabling access by the application process further comprises:
   denying access by the application process to the first data when the file type of the first data is determined to not be included in the registered one or more file type.

5. The method of claim 4, wherein said denying comprises:
   denying access by the application process to read a file of the first data, to read contents of a folder of the first data, to write to at least one of a file or folder of the first data, to rename a file or folder of the first data, to move a file or folder of the first data, or to copy over a file or folder of the first data.

6. The method of claim 1, further comprising:
   loading the application process into the application container; and
   generating a token for the application process that includes an identifier for the application container, the token being unmodifiable by the application process.

7. The method of claim 1, wherein the application container denies direct access by the application process to file system data.

8. A non-signal computer-readable storage device having program instructions recorded thereon that, when executed by one or more processing devices of a computing device, perform a method in a broker service operating in the computing device, the method comprising:
   receiving, at the computing device, an access request related to first data of a file system in the computing device containing data from an application process, the application process being a launched version of an application, the application process residing in an application container that prevents direct access by the application process to the file system, the access request including a token for the application process that includes an identifier for the application container and an indication of the first data requested in the access request; and
   enabling access by the application process to the first data, through the broker service that is operating in the computing device by retrieving the first data from a file storage of the file system, when the broker service determines that a file type of the first data is included in one or more file types registered for the application as file types currently associated with the application that the application is allowed to access, the one or more file types read from an application manifest received during an installation of the application process, and indications of the one or more file types stored in a secure location in the computing device accessible to the broker service and not accessible by the application.

9. The computer-readable storage device of claim 8, wherein the one or more file types include one or more file extensions, file kinds, or other file attributes or metadata, wherein said enabling comprises:
   accessing the registered one or more file extensions, file kinds, or other file attributes or metadata in the secure location accessible by the broker service and not accessible by the application process.

10. The computer-readable storage device of claim 9, wherein said enabling access by the application process comprises:
    determining a file type of the first data based on the indication of the first data requested in the access request;
    accessing the registered one or more file types for the application in the secure location;
    determining whether the file type of the first data is included in the registered one or more file types; and
    enabling the application process to access the first data when the file type of the first data is determined to be included in the registered one or more file types.

11. The computer-readable storage device of claim 10, wherein said enabling access by the application process further comprises:
    denying 0access by the application process to the first data when the file type of the first data is determined to not be included in the registered one or more file type.

12. The computer-readable storage device of claim 11, wherein said denying comprises:
    denying access by the application process to read a file of the first data, to read contents of a folder of the first data, to write to at least one of a file or folder of the first data, to rename a file or folder of the first data, to move a file or folder of the first data, or to copy over a file or folder of the first data.

13. The computer-readable storage device of claim 8, wherein the method further comprises:
    loading the application process into the application container; and
    generating a token for the application process that includes an identifier for the application container, the token being unmodifiable by the application process.

14. The computer-readable storage device of claim 8, wherein the application container denies direct access by the application process to file system data.

15. A computing system, comprising:
    at least one memory configured to store instructions to be executed;
    at least one processor device configured to execute the instructions; and
    a broker service executing on the at least one processor device, the broker service configured to:
       receive an access request related to first data of a file system in the computing device containing data from an application process, the application process being a launched version of an application, the application process residing in an application container that prevents direct access by the application process to the file system, the access request including a token for the application process that includes an identifier for the application container and an indication of the first data requested in the access request; and enable access by the application process to the first data, through the broker service that is operating in the computing device by retrieving the first data from a file storage of the file system, when the broker service determines that a file type of the first data is included in one or more file types registered for the application as file types currently associated with the application that the application is allowed to access, the one or more file types read from an application manifest received during an installation of the application process, and indications of the one or more file types stored in a secure location in the computing device accessible to the broker service and not accessible by the application.

16. The computing system of claim 15, wherein the one or more file types include one or more file extensions, file kinds, or other file attributes or metadata, wherein the broker service is configured to:

access the registered one or more file extensions, file kinds, or other file attributes or metadata in the secure location accessible by the broker service and not accessible by the application process.

17. The computing system of claim 16, wherein broker service is configured to:

determine a file type of the first data based on the indication of the first data requested in the access request;

access the registered one or more file types for the application in the secure location;

determine whether the file type of the first data is included in the registered one or more file types; and enable the application process to access the first data when the file type of the first data is determined to be included in the registered one or more file types.

18. The computing system of claim 17, wherein broker service is further configured to:

deny access by the application process to the first data when the file type of the first data is determined to not be included in the registered one or more file type.

19. The computing system of claim 18, wherein broker service is configured to:

deny access by the application process to read a file of the first data, to read contents of a folder of the first data, to write to at least one of a file or folder of the first data, to rename a file or folder of the first data, to move a file or folder of the first data, or to copy over a file or folder of the first data.

20. The computing system of claim 15, wherein the token is unmodifiable by the application process.

* * * * *